Patented Apr. 8, 1941

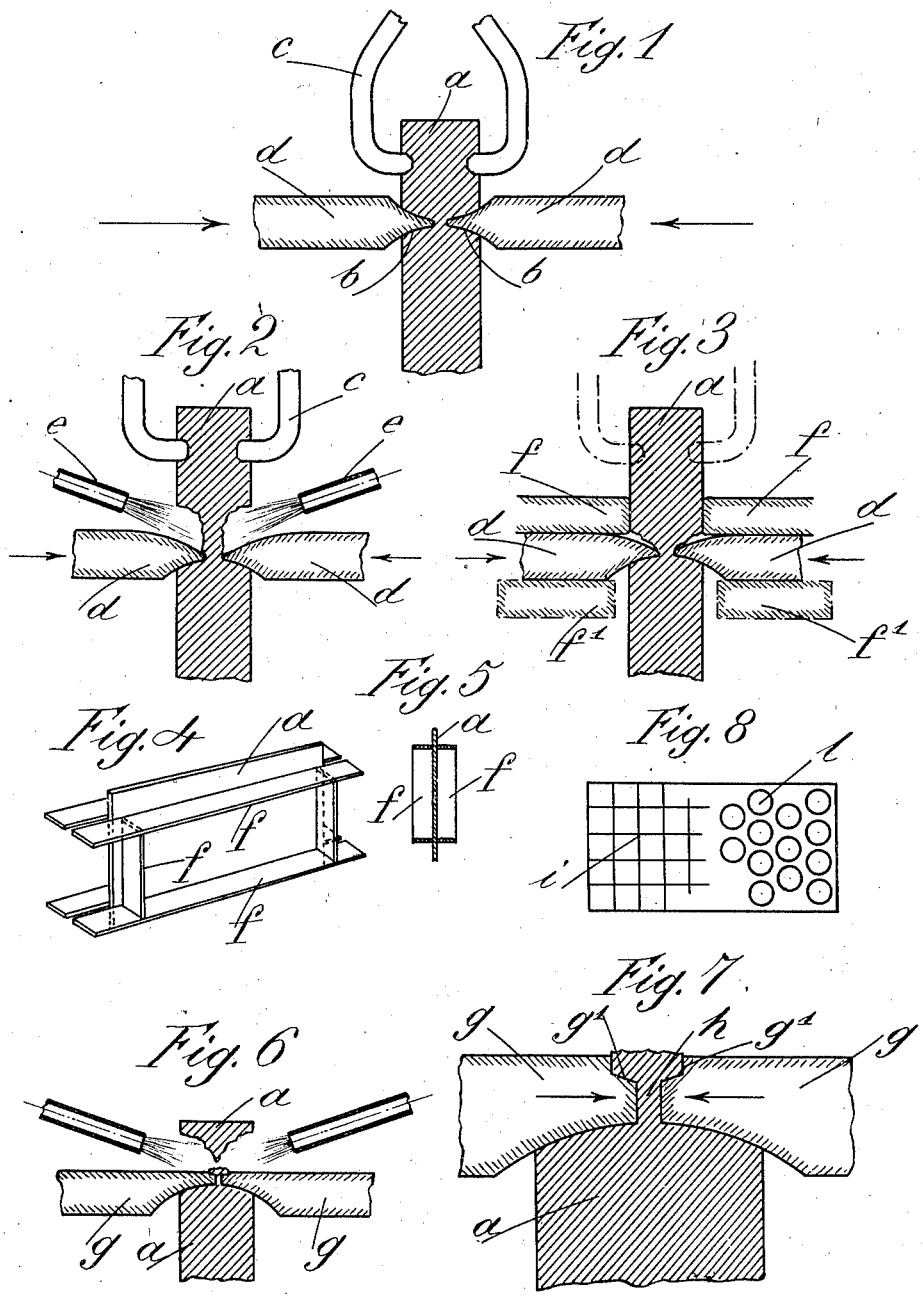

2,237,982

UNITED STATES PATENT OFFICE 2,237,982

METHOD OF TEMPERING GLASS

Edoardo Ferlito, Milan, Italy

Application December 16, 1937, Serial No. 180,084
In Italy September 25, 1937

4 Claims. (Cl. 49—79)

In tempering glass and crystal, especially sheets, tables or plates, and more particularly thin sheets thereof, it has hitherto been impossible to heat the sheets without giving rise to sunken impressions or indentations caused by the means for suspending each sheet in a vertical position. All of these suspending means distort the sheet by warping the edge of the same, at least in the zone of the retaining means. Furthermore, for sheets of dimensions exceeding the normal, the usual mode of suspension from two points only, has proved inadequate, a plurality of points of suspension being necessary.

These marks, besides being unsightly, lead to an actual distortion of the plane surface, arising from bubbles or blisters having been formed around the intermediate depression and produced by the points of the suspension clutches. Protuberances are always noticeable, in the upper edge, each protuberance corresponding to a dent. These not only mar (especially where thin, smooth glass is concerned) the said upper edge, but also render same apt not to fit into a metallic frame when being set up.

If the number of suspension clutches be increased, in order to ensure a straighter edge, the indented marks are also increased and remain insuppressible.

For looking-glasses (small mirrors for ladies' handbags, for instance) the impressions left by the clutches are intensified by the plating; and for plates of glass intended, for instance, for the tops of tables, or any other plates not meant to be fitted or framed, these distortions always must be retouched by a grinder, to a certain extent, which involves the grave risk of weakening—precisely at those two or more points—the molecular equilibrium due to the tempering. Still worse is the visual effect which distorts the images when it is necessary to look through the transparent glass, as, for instance, in precision apparatus, in wind-screens or panes of glass for motor vehicles and other applications; as well as where the reflection from mirrors is concerned. The aforesaid drawbacks are especially noticeable in glass plates having been exposed to greater heat in order to secure a tempering the perfection of which is characterized by the splintering of the plate into extremely minute, inoffensive fragments when it is subjected to a smart blow. When the plate is heated to a less degree, rupture is more frequent during the tempering process, and after having been tempered, it proves imperfect on being tested, the resultant particles being larger and consequently more likely to cause injury.

The present invention aims at avoiding the drawbacks above referred to and it resides essentially in the concept of separating from the body of the sheet, table or plate of glass proper, having been tempered, a part or a zone or such portions thereof as may, for any reason, be considered superfluous, through their being, for instance, distorted or carrying the marks left by the suspension device, regardless of the manner of separation or the number of portions separated or the occurrence of any distortion.

It is well known how it has been, until now, deemed impossible to separate any portion of a tempered glass plate without causing the complete fracture of the plate into characteristic fragments. According to the present invention the new molecular equilibrium as created by tempering may, on the contrary, be divided into several parts, viz. either provision is made for suitably forming in the glass plate, prior to the tempering of same, a channel or groove, the line of separation thereof being predisposed; or this species of channel or line or groove of rupture is obtained by appropriate means, especially during the heating for tempering purposes, viz. when the glass is at its pre-softening point. In either case the plate suspension means operate on the zone situated outside or upon the line of rupture, so that they thus only distort that strip—or those strips—which, after the plate has been tempered, may be suitably removed in any manner. Thus, the tempered plate is immune from distortion caused by its retaining and suspension means.

It is here stated, once for all, that "plate suspension" is meant to indicate any means whatever adapted to retain the plate in the furnace, preferably in a vertical or substantially vertical direction either by means of suspension with grippers or clutches at the upper edge, or by lateral traction with stretching, and also through the plate being held fast at all four edges thereof.

The concept set forth above may be applied with generality viz. in addition to the breaking strip, the lines of rupture may be formed on the plate in any way, and suitably in a multiple manner, so as to admit of same being divided into as many smaller portions as desired, it having once been tempered. The means for such division may, for instance, also be obtained by the formation on the same plate of glass of diversely tempered zones, with more or less energetic cooling of the various zones, thereby forming contiguous zones of diverse molecular equilibrium.

Furthermore, as will be seen later, the process may require the use of guide supports facing the cutting lines with a view to ensuring a better rectification of the plate with regard to the plane thereof.

The invention will be better understood on following the description and the accompanying drawing which shows in purely diagrammatic figures—of enlarged proportions for distinctness' sake—and in explanation, a few examples of the practical carrying out of the invention.

In this drawing:

Fig. 1 shows in cross section the upper part of a suspended plate in which the channels or grooves are obtained by grinding or any other mechanical means, either when cold or heated;

Fig. 2 shows, still in cross section, the same upper part of a plate wherein the grooves are formed mechanically but with the aid of some suitable fluid or other heating means;

Fig. 3 shows an example in which guide-supports are used, adapted to ensure the regular running of blades or rollers, without deviating;

Fig. 4 shows, in perspective, a glass plate compressed between two grippers in order to obtain the rectification on each of its four sides; or, also, slitting by pressure; and Fig. 5 is a cross section of Fig. 4;

Fig. 6 shows in cross section the upper part of the plate in which two grippers or holdfasts are performing the operation of throttling without cutting, while retaining the plate; the cutting being effected, for instance, through the injection of fluid—preferably alight;

Fig. 7 shows on a greatly enlarged scale, a detail of Fig. 6; and

Fig. 8 shows in a plan view a plate provided with multiple channels—rectangular or circular.

According to the example shown in Fig. 1, there are formed in the plate $a$ prior to its introduction into the furnace, viz. when cold, two symmetrical grooves or channels $b$—$b$ corresponding on either side. These may be formed, for instance, by grinding.

Similar channels or grooves $b$—$b$ may be obtained, on the other hand, by the plate being suitably suspended, for instance, by means of the usual holdfasts $c$ and its being so positioned that when, due to the heat, it has been brought to a proper and suitable state of softening, pointed tools, blades, or other implements $d$ or mechanical cutting rollers, suitably pressed or moved against the plates, form upon the latter the said grooves or channels $b$—$b$ and with a view to the said penetrating action, advantage may also be taken of the force of gravity afforded by the weight of the plate itself.

In order to facilitate a penetration of the blade or of the tools diagrammatically represented by $d$—$d$, a jet of flame or any source of heat, anywise obtained, as gas, for instance, through the nozzles $e$ (Fig. 2) may provide for the increased softening of the zones or lines where the plate is to be grooved.

Owing to the mechanical action of the tools $d$ it becomes advisable—if not indispensable—for the plate to be held over two guidepieces $f$—$f$ throughout the length thereof so as to afford support and to ensure the stability of the plates at all times and to guide the mechanical action of the tools and the action of the heat. These guide pieces or holdfasts must be perfectly straight and such as to compress the plate as at $f$—$f$ and to accompany or follow the tool as at $f'$, simultaneously and symmetrically on both sides so as to smooth or flatten the edge of the glass if they touch the same and to keep the cutting edge straight if they do not touch the plate.

In Figs. 4 and 5 there is schematically indicated how the said supports may be applied to the plate, in either case, it being, however, pointed out that as soon as the desired effect has been produced upon the plate, the said holdfasts must be removed. These operations of course call for extremely rapid action.

From Figs. 6 and 7 it is apparent how the holdfasts $g$—$g$ besides indenting the plate—heated to softening point—leave between them, on either side, a small appendage $h$ in such a manner that the said appendage, gripped between the two angular shoulders $g^1$—$g^1$ of the holdfast heads, acts as a holder to sustain the plate.

The holdfasts $g$ may be heated by any means, preferably by the passage of an electric current, but heated to the temperature of the glass to avoid the breakage of the plates; the said heating being carried to such an extent that the holdfasts are enabled to exactly follow the successive temperatures occurring in the plates being tempered, during the entire tempering period.

Fig. 8 shows a plate, grooved in a heated state, by means of rollers, gripping blades, sliding knives, etc. so as to obtain a number of channels—rectilinear $i$ or circular $l$, or of any other shape—intended to divide the plate into numerous parts as soon as it has been tempered, the detachment of one part from the other being obtained through the said indentations. This multiple grooving action might also be obtained by means of cross wires heated, for instance, by an electric current, while—this having already been referred to—detachment lines might also be obtained by means of a diversity of tempering in the various zones.

In any case, on the cutting line or lines being obtained, the detachment may be effected by hand, by grinding, through the electric current, or any mechanical means.

It is repeated that the drawing is only presented for the purpose of affording, diagrammatically, examples of the manner of carrying out the invention according to the concept underlying the latter, and it should be understood that the applications thereof are not limited to the examples cited, and that the invention may be diversely carried out without thereby departing from same. For instance, the depressions or grooves—however obtained—may suitably be provided on one side of the plates only.

Having now particularly described and ascertained the nature of my said invention and in what manner the same is to be performed, I declare that what I claim is:

1. A method of tempering glass sheets by heating the same to the point of softening and thereafter cooling which comprises, dividing the sheet into a marginal portion and a body portion by reducing the thickness thereof along an area extending completely thereacross, leaving both portions at their original thickness, thereby providing a weakened area extending across said sheet, gripping and suspending the sheet by the marginal portion during tempering, and severing the marginal portion from the body portion after the tempering operation at said weakened area, whereby to separate from the body portion of the original sheet the marginal portion thereof which may have become distorted during the tempering operation.

2. A method of tempering glass sheets by heating the same to the point of softening and thereafter cooling which comprises, dividing the sheet into a marginal portion and a body portion by cutting a groove completely thereacross, leaving both portions at their original thickness, thereby providing a weakened area extending across said sheet, gripping and suspending the sheet by the marginal portion during tempering, and severing the marginal portion from the body portion after the tempering operation at said weakened area, whereby to separate from the body portion of the original sheet the marginal portion thereof which may have become distorted during the tempering operation.

3. A method of tempering glass sheets by heating the same to the point of softening and thereafter cooling which comprises, initially heating the sheet to the point of softness, dividing the sheet into a marginal portion and a body portion by pressing a groove therein extending completely thereacross, leaving both portions at their original thickness thereby providing a weakened area extending across said sheet, gripping and suspending the sheet by the marginal portion during tempering, and severing the marginal portion from the body portion after the tempering operation at said weakened area, whereby to separate from the body portion of the original sheet the marginal portion thereof which may have become distorted during the tempering operation.

4. A method as claimed in claim 1 characterized by subdividing the body portion prior to the tempering of the sheet into a plurality of zones by reducing the thickness of the body portion along areas surrounding said zones leaving the remainder of the body portion at its original thickness, thereby providing additional weakened areas, and after tempering severing the body portion at the additional weakened areas.

EDOARDO FERLITO.